(No Model.)

E. HARRISS & J. N. TIGER.
CULTIVATOR ATTACHMENT.

No. 370,537. Patented Sept. 27, 1887.

WITNESSES:
Chas. Nida
E. M. Clark

INVENTOR:
Edward Harriss
John N. Tiger
BY Munn & Co.
ATTORNEYS.

UNITED STATES PATENT OFFICE.

EDWARD HARRISS AND JOHN N. TIGER, OF WAVERLY, NEBRASKA.

CULTIVATOR ATTACHMENT.

SPECIFICATION forming part of Letters Patent No. 370,537, dated September 27, 1887.

Application filed July 19, 1887. Serial No. 244,736. (No model.)

*To all whom it may concern:*

Be it known that we, EDWARD HARRISS and JOHN N. TIGER, of Waverly, in the county of Lancaster and State of Nebraska, have invented a new and Improved Cultivator Attachment, of which the following is a full, clear, and exact description.

Our invention relates to an improved cultivator attachment, and has for its object to provide a device of simple and cheap construction adapted for attachment to either a riding or walking cultivator, wherein listed corn, corn in rows, or any vegetable planted in rows may be expeditiously and effectively worked.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1:
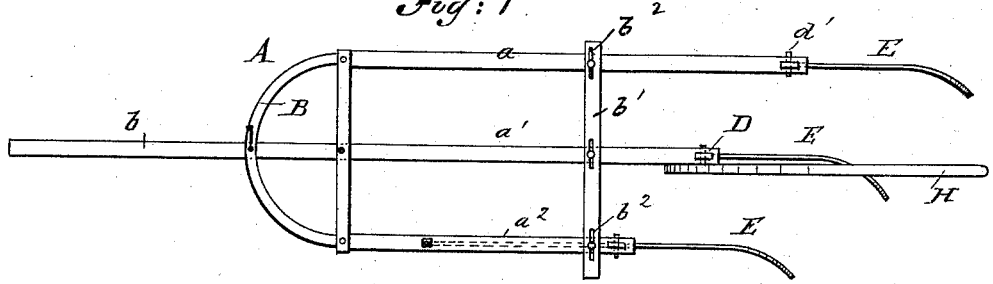
Figure 1:
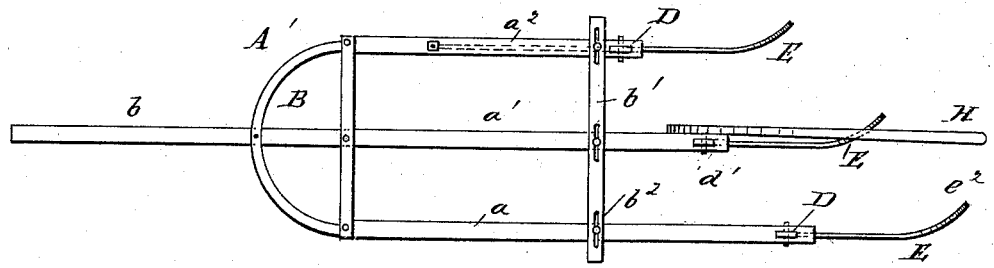
Figure 2:
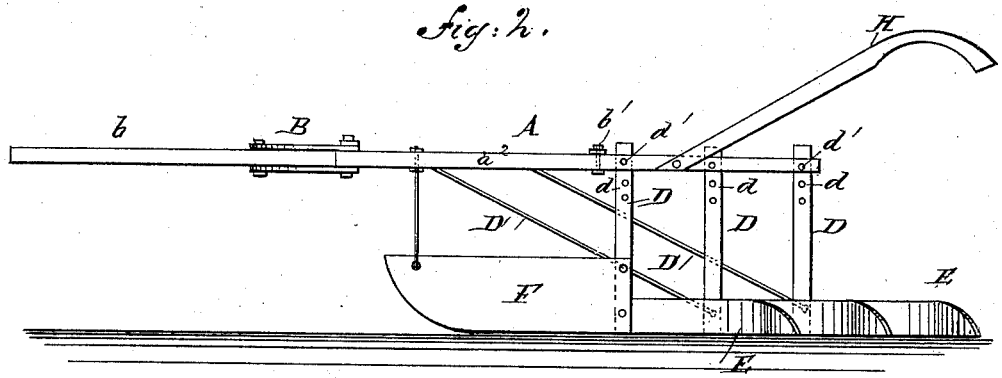
Figure 3:
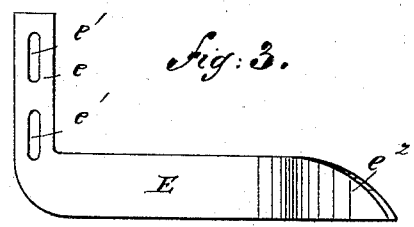

Figure 1 is a plan view of the attachment, and Fig. 2 is an inner side elevation of one section when divided as indicated by the dotted line in Fig. 1. Fig. 3 is a side elevation of one of the blades.

In carrying out the invention, the cultivator is made in two sections, A and A', one section being made to travel each side the corn-row, each of which sections is provided with three or more, preferably three, parallel longitudinal bars, $a$, $a'$, and $a^2$, of varied lengths, the outer bar, $a$, or the one farthest from the row, being the longest, the inner bar, $a'$, the next longest, and the inside bar, $a^2$, the shortest of all. The forward end of each bar $a$ $a'$ $a^2$ is pivoted in the inner straight side of a segmental frame, B, the bars $a$ $a^2$ at the ends of the frame, and the bar $a'$ in the center. The center bar, $a'$, may be made to project out from the frame for attachment either to a walking or riding cultivator, or the tongue or shaft $b$ may be made of a separate piece.

To regulate the distance intervening the frame-bars $a$, $a'$, and $a^2$, a plate, $b'$, is laid transversely upon their upper face, which plate, where it touches the several bars, is slotted longitudinally, as at $b^2$, the connection being effected by bolts passing through said slots and also the said bars. Thus the space intervening each bar may be varied or made equal, or great or small, as the nature of the work may demand.

At the end of each bar $a$, $a'$, and $a^2$ vertical standards D are adjustably attached, the said adjustment being vertical and effected by providing a series of apertures, $d$, transversely the upper end of each standard, recessing the several frame-bars at the end, passing the upper end of the standards up into said recess, and securing the standards at the desired height by passing a pin, $d'$, transversely through the bars and through one of the aforesaid apertures $d$. Each standard is retained in a perpendicular position by a brace-rod, D', attached at one end to the lower end of said standards, and at the other end to the under side of each frame-bar, as shown in Fig. 2.

The knives E, adapted for attachment to the standards D, are provided with an upwardly-projecting shank, $e$, integral with one end, having cut longitudinally therein elongated apertures $e'$, as shown in Fig. 3. In securing the blades E to the standards D a bolt is passed through the elongated apertures $e'$ of the shank, and also through suitable apertures in the standards, whereby the blades or knives may be adjusted vertically when desired. The outer end of each knife or blade is curved inward, as at $e^2$. The knives E are preferably made of steel, and are adapted to pulverize and plow the ground, the inward curve or twist $e^2$ being given the outer end of the knives to facilitate the throw of the earth in the direction of the row to be cultivated.

From the inner frame-bar, $a^2$, to the rear of the knife a shoe, F, is suspended at one end, and attached at the other to the standard D, as shown in Fig. 2, the lower edge of the shoe being in the same plane with the lower edge of the knives, as the shoes are adapted to travel next the corn-row and prevent large clods from rolling in upon the young corn.

A suitable handle, H, is attached to the frame, preferably to the rear of each central frame-bar, $a'$.

Having thus described our invention, what we claim as new, and desire to secure by Letters Patent, is—

1. The combination, with the graduated and adjustable frame-bars $a$, $a'$, and $a^2$ and the shoe F, suspended from the inner bar, $a^2$, of the standards D, adjustably attached to said frame-bars, and knives E, adjustably secured to said standards and having inwardly-curved outer ends, substantially as shown and described.

2. The combination, with the graduated and adjustable bars $a\ a'\ a^2$ and the shoe F, suspended from the inner bar, $a^2$, of the standards D, adjustably secured to said frame-bars, the brace-rods D', and knives E, adjustably secured to said standards, the said knives provided with an integral slotted shank, $e$, at one end, and having the other and outer end inwardly curved, substantially as and for the purposes herein set forth.

EDWARD HARRISS.
JOHN N. TIGER.

Witnesses:
H. ATKINSON,
ISAAC J. TIGER.